May 8, 1962 M. J. LIESER 3,033,512
POPPET VALVE
Filed April 23, 1959
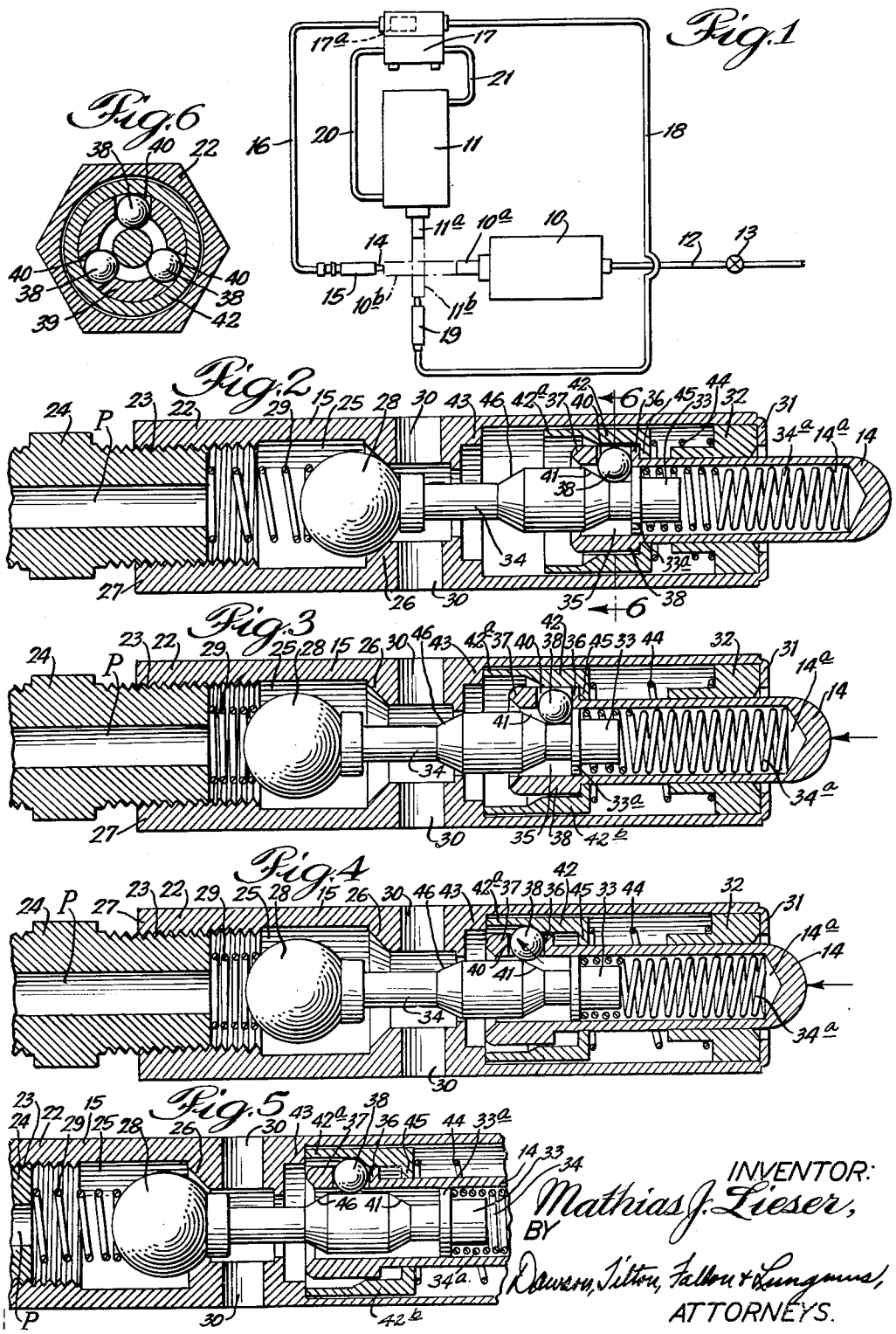
INVENTOR:
Mathias J. Lieser,
BY
Dawson, Tilton, Fallon & Lungmus,
ATTORNEYS.

3,033,512
POPPET VALVE

Mathias J. Lieser, Chicago, Ill., assignor to Mead Specialties Company, Inc., Chicago, Ill., a corporation of Illinois Filed Apr. 23, 1959, Ser. No. 808,471
6 Claims. (Cl. 251—21)

This invention relates to a poppet valve and, more particularly, to a poppet valve equipped with a valve operator or plunger which is effective to open and close the valve both during the same stroke.

It is an object of this invention to provide a novel poppet valve which is especially suitable for use in sequential operations using pressurized fluid as the means for actuating work devices. Another object is to provide a poppet valve adapted to be interconnected into a pressurized fluid system where a single movement of the valve actuator temporarily exhausts the pressure fluid and thereby places the system in condition for subsequent operations as would be called for by a second poppet valve. Still another object is to provide a system equipped with poppet valves wherein work operators are adapted for sepuential relation, as called for by manipulation of the poppet valves and wherein at least one of the valves is arranged for opening and closing by a single stroke so that the other poppet valve is effective to perform work by exhausting another portion of the system. Other objects and advantages of this invention can be seen as the specification proceeds.

The invention will be explained in conjunction with an illustrative embodiment shown in the accompanying drawing, in which—

FIG. 1 is a schematic representation of a pressure fluid system embodying teachings of this invention;

FIG. 2 is an elevational view partially in section of a poppet valve constructed according to this invention;

FIG. 3 is a view similar to FIG. 2, but showing the operative parts of the valve in a different condition;

FIG. 4 is a view similar to FIGS. 2 and 3, but showing the operative elements of the valve in yet another condition;

FIG. 5 is a fragmentary view similar to FIGS. 2–4; and

FIG. 6 is a transverse sectional view as would be taken along the line 6—6 of FIG. 2.

In the illustration given, and with particular reference to FIG. 1, the numeral 10 designates a work unit such as a fluid pressure-actuated cylinder and piston rod unit. The numeral 11 designates a second cylinder and piston rod unit, with the piston rods being designated by the numerals 10a and 11a for the units 10 and 11, respectively. The extended positions of the piston rods 10a and 11a are seen in dotted lines and are designated, respectively, by the numerals 10b and 11b. The unit 10 is seen to be connected at one end to a line supplying pressurized fluid and which is designated 12, and which may contain a valve 13. Opening of the valve 13 may be effective for moving the piston rod 10a from its solid line position to that position shown in dotted line and designated 10b. During the course of the stroke of the piston rod 10a, it engages the plunger or operator 14 of a poppet valve 15. The poppet valve 15 through conduit 16, is coupled to a piston-actuated supply and exhaust valve 17. Such a valve 17 may be seen in my Patent No. 2,792,019. The position of the piston in valve 17 is designated by the numeral 17a. Connected to the opposite end of the chamber holding piston 17a is a conduit 18 which in turn is connected to a poppet valve 19. The poppet valve 19 is positioned for engagement by the piston rod 11a at the position thereof designated 11b. The valve 17 is coupled by conduits 20 and 21 to the ends of the unit 11 to supply and exhaust pressure fluid alternately therefrom.

In the operation of the system depicted schematically in FIG. 1, the opening valve 13 causes the piston rod 10a to be extended to the position designated 10b. During this extension, the plunger 14 of the poppet valve 15 is moved to the left to vent pressure fluid from the line 16. This in turn causes the piston 17a to move to the left in valve 17 and to the dotted position of the piston 17a seen in FIG. 1. When this occurs, the line or conduit 20 is vented to the atmosphere and the piston (not shown) within unit 11 moves downwardly to position the piston rod 11a in the position designated 11b. At the end of the downward stroke of the piston rod 11a, the poppet valve 19 is actuated which exhausts pressurized fluid through conduit 18.

In the foregoing operation, if the poppet valve 15 were still in a position to vent line 16, the subsequent venting of line 18 through poppet valve 19 would be ineffective to move the piston 17a to the right in FIG. 1. However, the poppet valve 15 is constructed so as to close after being temporarily opened by movement of piston rod 10a, so that pressure is permitted to build up on the left side of piston 17a so that when conduit 18 is vented, the piston 17a will move to the right. This in turn vents conduit 21 and applies pressure to conduit 20. At this stage, the piston rod moves upwardly because of the pressure differential so that a complete cycle of operation of the unit 11 can be achieved while the unit 10 has its piston rod extended. Further, this is all done without the need of electrical switches such as limit switches or the like.

An example of the utility of this system would lie in an operation where a work piece is first positioned for an operation thereon, such as punching, the punching performed, and thereafter the work piece retracted. For such an operation, the unit 10 would position the work piece while the unit 11 would perform the punching or other operation. Heretofore, in such an environment, it has been necessary to resort to complicated pressure fluid or electrical switching arrangements since ordinary poppet valves would, in effect, result in tying the system up.

The improved poppet valve 15 is seen in the remaining views of the drawing, and is seen to include a tubular casing or body 22. In FIG. 5, this body is seen to have a hexagonal outline in transverse section although other outlines can be satisfactorily employed. One end of the tubular body 22 is threaded, as at 23, for the receipt of a fitting 24. The fitting 24 is adapted to be coupled to a source of pressure fluid, designated by P.

The tubular body 22 provides a passage 25 therein and, intermediate the ends thereof, is equipped with a valve seat 26. Mounted within the passage 25 and between the valve seat 26 and the end 27 equipped with the fitting 24, is a valve element 28. The valve element 28 may conveniently take the form of a rubber ball which seats against the tapered seat 26 and conforms thereto, as is seen in FIG. 2. Interposed between the fitting 24 and the valve element 28 is a coil spring 29 effective to bias or urge the element 28 into seating relationship with the seat 26.

The body 22 on the side of seat 26 remote from the ball 28 is equipped with an exhaust passage 30 through which the pressurized fluid P is adapted to be exhausted when the ball valve element 28 is positioned as seen in FIGS. 3 and 4.

The other end 31 of the body 22 is equipped with an apertured closure 32. The apertured closure has slidably mounted therein for reciprocation on the axis of the body 22, a plunger 14. The plunger 14 has a hollowed longitudinally extending portion 14a which slidably carries one end 33 of a valve stem 34. The valve stem 34 is equipped in the portion 33 thereof with the flange 33a. Interposed between the flange 33a and the outer end of the hollow portion 14a is a coil spring 34a. The spring 34a is effective to urge the plunger 14 away from the stem 34 and in a generally coaxial direction.

The plunger 14 at its inner end is equipped with a chamber 35 provided by laterally extending, spaced-apart flange elements 36 and 37. Alternatively, the chamber 35 and spaced-apart flanges 36 and 37 can be considered to be a single flange or lateral enlargement at the inner end of plunger 14 in which a plurality of balls 38 are mounted for rolling movement (see FIG. 5). The enlarged portion of the inner end of the plunger in FIG. 5 is designated by the numeral 39, and the bores in which the balls 38 roll to assume different lateral positions relative to the stem 34 are designated by the numeral 40.

The stem 34 is equipped with a shoulder 41 which is adapted to be contacted by the balls 38. Thus, when the plunger 14 is moved inwardly, as can be seen from a comparison of FIGS. 2 and 3, the balls 38 provide means for directly coupling the plunger 14 with the stem 34 so that a positive force is exerted against the ball valve element 28—the displacement effected thereby being seen in FIG. 3.

Mounted concentric to the plunger 14 is a sleeve 42 which has a stepped interior wall providing an enlarged portion 42a and a constricted portion 42b. As can be seen in FIG. 3, the constricted portion 42b is aligned with the balls 38 and the bore 40 so that outward movement of the balls 38 is restricted. When this is the case, the stem 34 must move to the right with the plunger 14 to unseat the valve element 28.

As the plunger 14 is depressed or moved further to the left, as seen in the sequence of views in the drawing, the sleeve 42 is eventually restricted by an abutment 43 in the tubular body 22 so that the enlarged portion 42a is positioned opposite to and in alignment with the balls 38—this being seen in FIG. 4. Thus, the balls 38 are permitted to move radially outwardly and this releases the positive pressure on stem 34, permitting the spring 29 to force the ball valve element 28 back into seating engagement while moving the stem 34 to a position further inwardly of plunger 14. In this operation, the beginning of which is pictured in FIG. 4, it is seen that the spring 34a opposes this operation, but the springs 29 and 34a are so selected that the spring 34a can be compressed by the operation of spring 29 in returning the ball element 28 into its seated position.

Interposed between the closure 32 and the sleeve 42 is another coil spring 44 which is effective to move the sleeve 42 to the left whenever the plunger 14 is so moved. Again, the spring 44 is considerably weaker than the spring 29 so that it is ineffective to cause unseating of the valve element 28. To maintain the sleeve 42 and the enlarged portion 42a of plunger 14 in their cooperating relation during the initial inward movement of the plunger 14, the sleeve 42 is equipped with an inwardly extending flange 45 which is urged against the enlarged position 42a of the plunger 14.

In the operation of the valve 15 just described, the initial inward movement of the plunger 14 causes the balls 38 to be confined between the constricted portion 42b of sleeve 42 and the shoulder 41 of stem 34 (see FIG. 2). The further inward movement of plunger 14 is accompanied by a corresponding inward movement of sleeve 42 under the urging of spring 44. So long as plunger 14 and sleeve 42 move together, the balls 38 are restricted against radial outward movement and the stem 34 is locked or directly coupled to plunger 14 so that any force exerted on the outer end of plunger 14 is directly transmitted to stem 34 to unseat ball 28. At an intermediate point in the inward movement of plunger 14, the sleeve 42 engages the abutment 43 which halts further movement to the left, i.e., inwardly, of the sleeve 42. This is the position of these elements seen in FIG. 3. Further inward movement of the plunger 14 brings the balls 38 into a position of alignment with the enlarged portion 42a of the sleeve 42, which permits them to move radially outwardly and thus relieve the bearing pressure previously exerted against the shoulder 41 of stem 34. This is the condition depicted in FIG. 3. At this instant, the stem 34 snaps outwardly (i.e., away from ball valve 28) and into the plunger 14 under the influence of the spring 29. The spring 29 at the same time causes closing the passage 25 by forcing of resilient ball valve 28 into seating engagement with the seat 26. Thus, during a single stroke of the reciprocation of the plunger 14, the poppet valve 22 is both opened and closed. FIG. 4 shows the stem 34 just about to return, while FIG. 5 shows stem 34 just about completely returned with the plunger 14 still moving inwardly.

I have found it advantageous to taper the shoulder 41 as seen, since a square shoulder might result in inadvertently lodging or locking the balls 38 in one position. I have also found it advantageous to provide for a slight movement of the sleeve 42 as indicated, especially where the movement of the plunger 14 might be quite rapid. The stroke or "throw" of the sleeve 42 can be reduced materially and, in effect, eliminated, if the plunger 14 is moved slowly enough. However, it is common to use fluid pressure operators that move with considerable rapidity and therefore the sleeve is provided with a certain amount of throw. In the ordinary poppet valve where a one-quarter inch diameter ball 28 is employed, the throw might be of the order of one-eighth of an inch.

I have also found it advantageous to provide the stem 34 with a complementary shoulder 46 located between the shoulder 45 and adjacent the ball valve 28. With very fast moving operations where the plunger is returned quickly, a square or sharply inclined shoulder may also result in locking of the balls 38.

While, in the foregoing specification, I have set forth a detailed description of an embodiment of the invention for the purpose of illustration thereof, those skilled in the art will see many changes in the details herein given without departing from the spirit and scope of the invention.

I claim:

1. In a poppet valve, an elongated body having a fluid passage therein, a valve seat in said passage, a valve element in said passage, means in said passage biasing said element into seating relation with said seat, a shoulder-equipped valve stem in said passage, means in said passage biasing said stem against said valve element in a direction to unseat the same but ineffective to unseat said valve element, a stem operator in said passage concentric with said stem and equipped with an end adapted to receive a valve element-unseating force from without said body, said stem operator at its inner end being equipped with a ball-containing chamber, a ball in said chamber adapted to bear against said stem shoulder, sleeve means movably mounted in said passage concentric with said stem operator, said sleeve means being equipped with a restricted inner portion operative to restrict outward movement of said ball prior to the end of the movement of said stem operator toward said valve element, said sleeve means having a relieved inner portion permitting outward movement of said ball adjacent the end of said stem operator movement and thereby removing said force from said stem and valve element.

2. A poppet valve comprising an elongated tubular body having one end adapted to be communicated with a source of pressurized fluid, a valve seat in the passage necessarily provided by said tubular body, a valve element in said passage between said seat and said one end, means in said passage urging said valve element into seating relation with said seat, a fluid outlet port in said body communicating with said passage on the side of said seat remote from said one end, a hollow plunger mounted in said body and extending out of the other end thereof, said plunger at its inner end being equipped with a pair of flanges, a plurality of balls mounted for rolling movement between said flanges, a valve stem mounted in said plunger and extending axially out of the inner end thereof and against said valve element, biasing means in said plunger urging said plunger and stem apart in a coaxial direction, an apertured end closure for said other end of said body supporting said plunger for axial movement in said body, said stem being equipped with a shoulder with said balls being positioned for contact with said shoulder, a sleeve slidably mounted in said body concentric with said plunger and equipped at the end thereof remote from said valve element with an inwardly extending flange, spring means in said body extending between said sleeve flange and said closure urging said sleeve flange against a flange of said plunger and effective to urge said stem against said valve element but ineffective to unseat said valve element, said sleeve having a stepped inner wall with the restricted portion provided thereby being adjacent said sleeve flange, the said restricted portion confining said balls and necessarily coupling said stem and plunger for common movement when said plunger is moved toward said valve element, an abutment in said passage spaced from the inner end of said sleeve and adjacent said seat effective to stop movement of said sleeve under the urging of said spring means and position the enlarged portion of said stepped wall in alignment with said balls thereby permitting said balls to move outwardly and release the positive force on said stem whereby said valve element closed during the last portion of the inward stroke of said plunger.

3. In a poppet valve, a body providing a chamber for pressurized fluid and equipped with inlet and outlet ports, a valve element within said chamber urged against the body about said inlet port and in seating relation therewith to close the same, a stem reciprocably mounted in said body and movable therein to unseat said valve element, a stem operator reciprocably mounted in said body in axial alignment with said stem and having a portion extending outward of said body for application of a valve element-unseating force thereagainst, means for coupling said stem and stem operator together for only a portion of the valve element-unseating stroke thereof, and means between said stem and stem operator urging the two apart, said coupling means including a plurality of balls movably carried by said stem operator and about said stem, said stem being equipped with a shoulder engageable by said ball, and means in said body restricting movement of said balls away from said shoulder during said portion of the stroke thereof, said movement restriction means including a sleeve reciprocably mounted in said body and disposed about said stem operator and balls, said sleeve having a constricted interior portion to restrict movement of said balls away from said shoulder and an enlarged interior portion to accommodate said movement.

4. In a poppet valve, an elongated body having a fluid passage therein, a valve seat in said passage, a valve element in said passage, means in said passage biasing said element into seating relation with said seat, a shoulder-equipped valve stem in said passage, means in said passage biasing said stem against said valve element in a direction to unseat the same but ineffective to unseat said valve element, a stem operator in said passage concentric with said stem and equipped with an end adapted to receive a valve element-unseating force from without said body, said stem operator at its inner end being equipped with a ball-containing chamber, a ball in said chamber adapted to bear against said stem shoulder, sleeve means movably mounted in said passage concentric with said stem operator, said sleeve means being equipped with a restricted inner portion operative to restrict outward movement of said ball prior to the end of the movement of said stem operator toward said valve element, said sleeve means having a relieved inner portion permitting outward movement of said ball adjacent the end of said stem operator movement and thereby removing said force from said stem and valve element, said shoulder being outwardly tapered in a direction toward the end of said stem adjacent said valve element.

5. In a poppet valve, an elongated body having a fluid passage therein, a valve seat in said passage, a valve element in said passage, means in said passage biasing said element into seating relation with said seat, a shoulder-equipped valve stem in said passage, means in said passage biasing said stem against said valve element in a direction to unseat the same but ineffective to unseat said valve element, a stem operator in said passage concentric with said stem and equipped with an end adapted to receive a valve element-unseating force from without said body, said stem operator at its inner end being equipped with a ball-containing chamber, a ball in said chamber adapted to bear against said stem shoulder, sleeve means movably mounted in said passage concentric with said stem operator, said sleeve means being equipped with a restricted inner portion operative to restrict outward movement of said ball prior to the end of the movement of said stem operator toward said valve element, said sleeve means having a relieved inner portion permitting outward movement of said ball adjacent the end of said stem operator movement and thereby removing said force from said stem and valve element, said shoulder being outwardly tapered in a direction toward the end of said stem adjacent said valve element, said stem being equipped with a complementary tapered shoulder between the first-mentioned shoulder and the end of said stem adjacent said valve element.

6. In a poppet valve, an elongated body having a fluid passage therein, a valve seat in said passage, a valve element in said passage, means in said passage biasing said element into seating relation with said seat, a shoulder-equipped valve stem in said passage, means in said passage biasing said stem against said valve element in a direction to unseat the same but ineffective to unseat said valve element, a stem operator in said passage concentric with said stem and equipped with an end adapted to receive a valve element-unseating force from without said body, said stem operator at its inner end being equipped with a ball-containing chamber, a ball in said chamber adapted to bear against said stem shoulder, sleeve means movably mounted in said passage concentric with said stem operator, said sleeve means being equipped with a restricted inner portion operative to restrict outward movement of said ball prior to the end of the movement of said stem operator toward said valve element, said sleeve means having a relieved inner portion permitting outward movement of said ball adjacent the end of said stem operator movement and thereby removing said force from said stem and valve element, said shoulder being outwardly tapered in a direction toward the end of said stem adjacent said valve element, said stem being equipped wth a complementary tapered shoulder between the first-mentioned shoulder and the end of said stem adjacent said valve element, said means biasing said stem including spring means in said passage urging said sleeve means toward said valve element, cooperating abutment means on said stem operator and said sleeve means limiting the movement of said sleeve means toward said valve element.

References Cited in the file of this patent

UNITED STATES PATENTS

| | | |
|---|---|---|
| 1,624,130 | Beggs | Apr. 12, 1927 |
| 1,817,180 | Drake | Aug. 4, 1931 |
| 2,568,450 | Hjarpe | Sept. 18, 1951 |
| 2,643,678 | Paradise | June 30, 1953 |
| 2,716,014 | Dinkelkamp | Aug. 23, 1955 |
| 2,894,713 | Savage | July 14, 1959 |